June 23, 1925.

S. K. DENNIS 1,543,602

VARIABLE DRIVE FOR PLANTERS

Filed April 30, 1923　　3 Sheets-Sheet 1

Inventor
Samuel K. Dennis,
By H.P. Doolittle
Atty.

June 23, 1925.

S. K. DENNIS 1,543,602

VARIABLE DRIVE FOR PLANTERS

Filed April 30, 1923    3 Sheets-Sheet 2

Inventor.
Samuel K. Dennis,

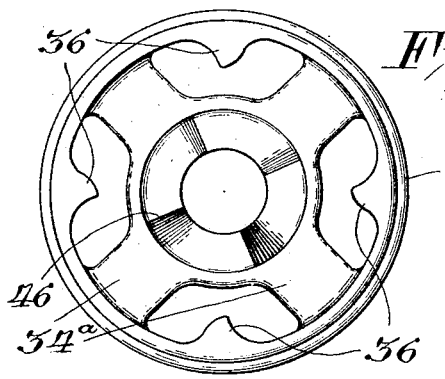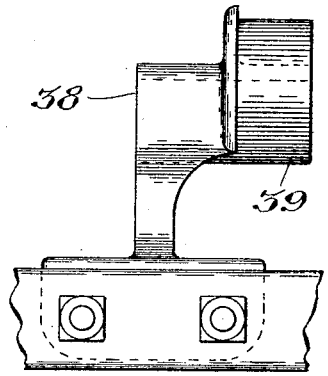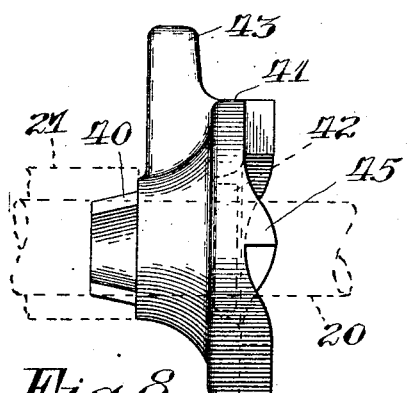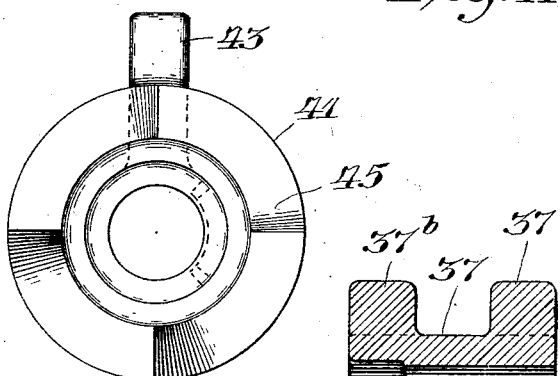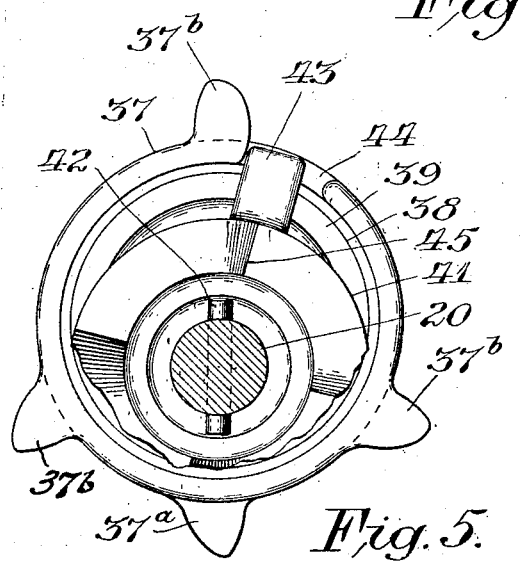

Patented June 23, 1925.

1,543,602

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

VARIABLE DRIVE FOR PLANTERS.

Application filed April 30, 1923. Serial No. 635,538.

*To all whom it may concern:*

Be it known that I, SAMUEL K. DENNIS, a citizen of the United States, residing at Chicago, in the county of Cook and State of Illinois, have invented certain new and useful Improvements in Variable Drives for Planters, of which the following is a full, clear, and exact specification.

My invention is directed to improvements in the drive mechanism for the seed dispensing plates of planters and the principal object in view is to provide a variable drive device of simple form that will permit the degree of rotation given the seed plate driving shaft to be readily changed and made either continuous or intermittent.

A further object is to provide a device that will, when set for intermittent operation, give the seed shaft a jerky movement which, when communicated to the seed plates of a planter, tends to agitate the seeds to some extent and assure their lodgement in the seed cells of the plates.

The invention accordingly resides in the combination of elements, details of construction and parts, and the equivalents thereof, hereinafter described and claimed and through which the foregoing objects are attained.

Referring to the drawings—

Fig. 5 is a detail end view of the driving elements in my device;

Figs. 7 to 11 are detail views of the parts composing the variable drive device.

Figure 1:
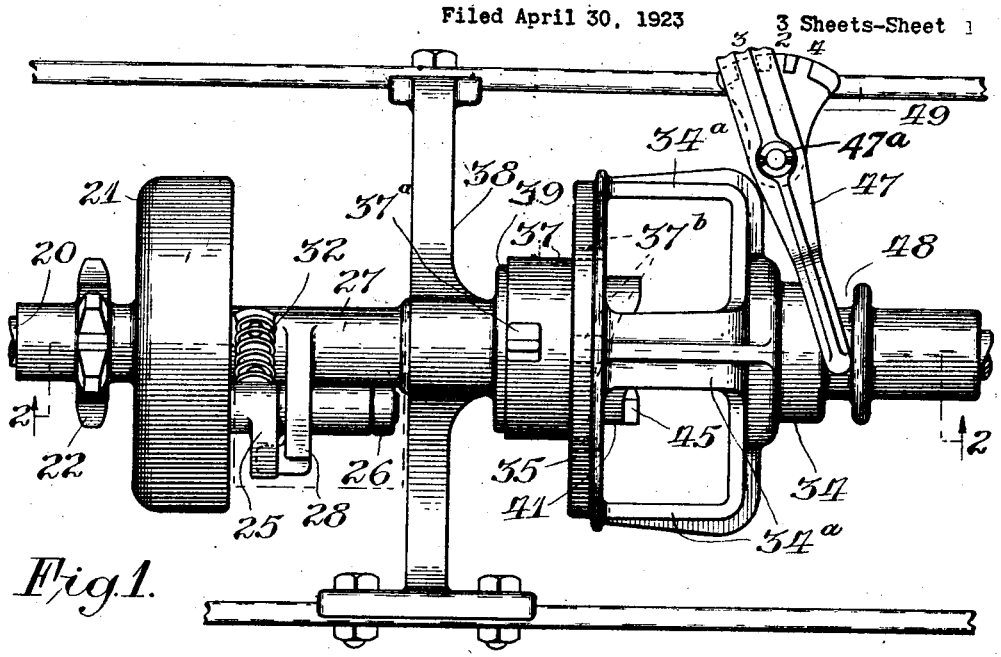
Fig. 1 is a plan view of the mechanism comprising my invention.

As in prior mechanisms of this general type, the variable drive device of my invention is usually operated in connection with an intermittently actuated clutch designed to be given one complete revolution at each actuation. This clutch may be of any well known type of so-called check-row planter clutch and, in the present instance, there is shown as journaled at approximately the middle of the seed plate driving shaft 20 a clutch of the above mentioned type comprising the dished member 21 which has integrally formed with it the sprocket pinion 22 by which the member 21 is continuously driven from the axle of the planter. The member 21 has its rim formed with internal notches or depressions 23 throughout its circumference with which the roller 24 on the locking pawl or dog 25 cooperates. Pawl 25 is pivoted between ears 26 formed on an elongated sleeve 27 which is also journaled on shaft 20. A stop arm 28 projects from sleeve 27 adjacent the pawl or dog 25 and both the pawl and stop arm are formed with portions designed to engage a trip roller 29 on a trip arm 30 carried on rock shaft 31. In general, the parts so far described are well known in connection with check-row corn planter construction and the clutch just described is similar in all essentials to that disclosed and more specifically described in the patent to Dennis No. 1,203,591, Nov. 7, 1916. For the purposes of the present disclosure, it is sufficient to know that the rock shaft 31 is periodically actuated by the buttons on the check-row wire, thereby withdrawing trip arm 30 and allowing pawl 25, which is pressed by the spring 32, to engage any one of the depressions 23 whereupon the continuously driven member 21 of the clutch becomes locked to sleeve 27 and the two move together through one revolution when pawl 25 and stop arm 28 are again engaged by trip roller 29 and the clutch thrown out. Ordinarily each complete revolution of the clutch is imparted to the seed shaft 20 and the driving relation of the shaft to the seed plates 33 is such as to move them sufficiently to carry four seed cells over the drop and four kernels or seeds are accordingly dispensed at each actuation of the clutch. In order that the number of kernels dropped may be varied by varying the movement given the seed plates, although the clutch cycle remains constant, and either 2, 3 or 4 kernels dispensed at each actuation of the clutch, I have provided the following mechanism.

Figure 2:
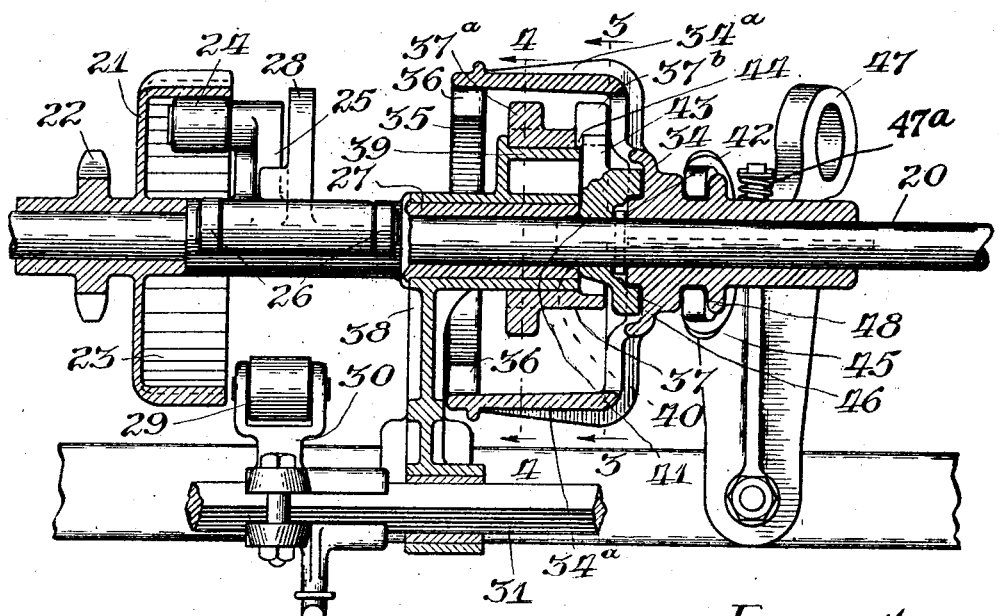
Fig. 2 is a vertical section on the line 2—2 of Fig. 1.
Figure 6:
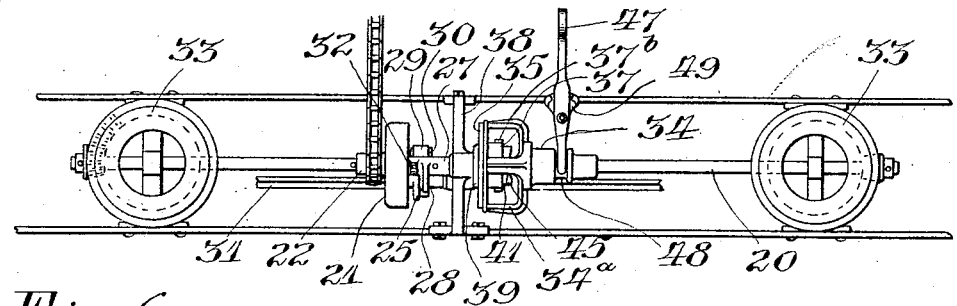
Fig. 6 is a plan view of the runner frame of a corn planter showing the relation of the invention to the seed plate driving mechanism.

Just beyond the end of sleeve 27 on shaft 20 there is splined a driven element or wheel 34 which has spokes or arms 34ª extending first radially and then horizontally over sleeve 27. These arms carry on their ends a rim 35 which in this instance is provided with four equally spaced internal lugs or teeth 36, this wheel forming a casing within which there is mounted a drive element or pinion 37. In order that drive element or pinion 37 shall be eccentrically journaled with relation to the axis of wheel 34 and brought into proper position to cooperate on one side with the lugs or teeth 36 on rim 35, there is provided a bearing bracket 38 which is supported on the runner frame as best shown in Fig. 1 and provided with an opening receiving the shaft 20 and sleeve 27 as shown in Fig. 2. Surrounding this opening there is eccentrically formed a bearing 39 on which is journaled the driving element 37. The end of sleeve 27 is flush with the end of bearing 39 carrying pinion 37 and this end of sleeve 27 is formed to interlock with a lug 40 (Fig. 8) on a clutch element 41 which is also journaled on shaft 20 and held in position by a transverse pin 42. As driving means for the eccentrically mounted pinion 37, a radially projecting finger 43 is provided on the clutch element 41 and this finger engages in an opening 44 formed in the edge of pinion 37 which extends a little beyond the bearing 39 and overhangs the part 41. By this arrangement the pinion 37 is rotated with sleeve 27, the eccentric movement being permitted by the free movement of finger 43 in the opening 44. The clutch element 41 is provided on its outer face with ratchet teeth 45 and these cooperate with complemental teeth 46 formed on the inner side of the hub of the wheel 34, and in order to shift this wheel into the driving position desired, a spring pressed lever 47 is provided which has the usual shifting fork engaging a groove 48 in the wheel hub. The outer portion of this lever cooperates with notches in a sector 49 which is designed to lock the lever in position to place the driving mechanism in adjustment for dropping the number of seeds desired, and it is yieldingly held in position by a coil spring 47ª mounted on the projecting end of the fulcrum pin of the lever. For cooperation with the lugs 36 on the wheel 34, the driving element or pinion 37 is provided with a plurality of sets of radially extending projections 37ª, 37ᵇ and in this instance two sets are shown, the set 37ª consisting of two diametrically disposed teeth or projections and the adjacent set 37ᵇ consisting of three equally spaced projections. The arrangement is such that the wheel 34 may be shifted by lever 47 to bring the clutch teeth 45, 46 into locking relation, as in Fig. 2, or to bring the lugs 36 into driving relation with either set of driving projections on pinion 37 as shown in Fig. 1.

Figure 3:
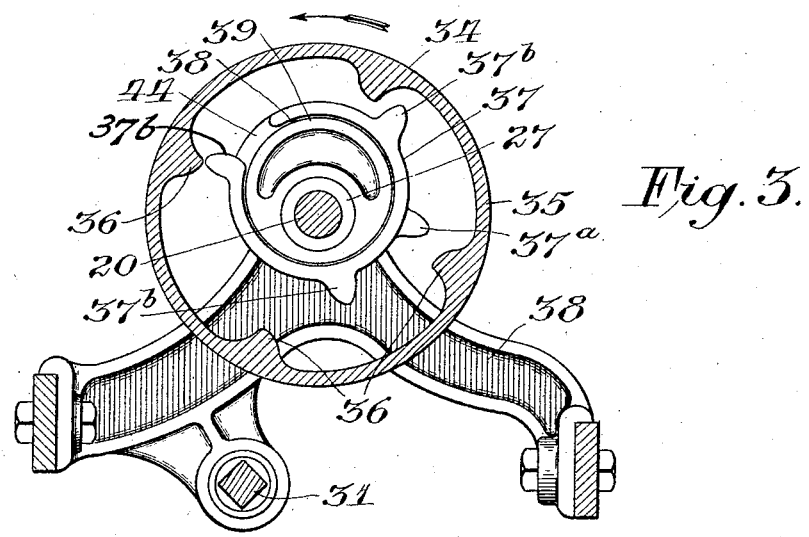
Fig. 3 is a detail sectional view on line 3—3 of Fig 2.
Figure 4:
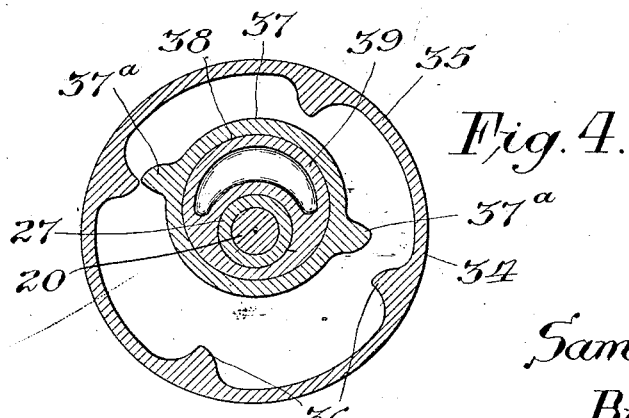
Fig. 4 is a similar view on the line 4—4 of Fig. 2.

The operation of my device is as follows:—When it is desired to give the shaft 20 a full revolution at each actuation of the main drive clutch, the wheel 34 is set at its extreme inward position by moving lever 47 to the outer notch marked "4" in Fig. 1 which interlocks the clutch teeth 45, 46 and causes shaft 20 to be given the full revolution of the main clutch. If less than the full revolution is desired, lever 47 and with it wheel 34 is shifted to either of the other notches marked "2" or "3" in Fig. 1. When set in the notch marked "3" the rim 35 on wheel 34 will be positioned over the set of projections 37ᵇ on pinion 37 and as this set contains three teeth, its rotation will cause three successive lugs on rim 35 to be engaged, and the wheel 34 and with it shaft 20 given approximately two-thirds of the revolution of the main clutch. If the lever is in the central notch marked "2", rim 35 will be brought into driving relation with projections 37ª and a half revolution of shaft 20 will be given at each actuation of the main clutch. It is specially to be noted that when the drive is set for either half or two-thirds of the full revolution, the movement of pinion 37 is imparted to wheel 34 in an interrupted manner, that is, one tooth of a set on pinion 37 will engage a lug on rim 35, move it a certain distance and then release it and, after a certain interval, the next projection of the set will engage the succeeding lug and move it another part of the total movement. If the wheel 34 is set for two-thirds of a revolution, each engagement of a projection 37ᵇ with a lug 36 will move wheel 34 a third of the total movement and there will be a short interval between each engagement of the lugs and projections, thus resulting in a desirable jerky movement of shaft 20 and the seed plates. The action is similar when set for a half revolution, the illustrations in Figs. 3 and 4 clearly showing how the successive engagement of the projections and lugs takes place at each adjustment.

From the above description, it will be evident that I have devised a simple and reliable form of mechanism for imparting a variable amount of movement to the seed plates of a planter and that alterations in the specific construction disclosed are possible within the scope of the following claims.

I claim as my invention:

1. A variable drive device comprising a shaft, a driven wheel on said shaft, said wheel having a laterally offset rim provided with a plurality of equally spaced lugs on its inner side, a rotary driving element within said rim and journaled on an axis eccentric to that of the wheel, a plurality of sets of spaced projections on said driving element, and means for putting any set of said projections into engagement with the lugs on the rim.

2. A variable drive device comprising a shaft, a driven wheel on said shaft, said wheel having a laterally offset rim provided with four equally spaced lugs on its inner side, a rotary driving element within said rim and journaled on an axis eccentric to that of the wheel, a pair of opposite radial projections on said element, and means for moving said lugs and projections into and out of driving relation, said projections being designed to engage the lugs successively.

3. A variable drive device comprising a shaft, a driven wheel on said shaft, said wheel having a laterally offset rim provided with equally spaced lugs on its inner side and with a clutch part on the end of the hub adjacent said rim, a driving sleeve journaled on the shaft within said rim and provided with a complemental clutch part on the end opposite said hub, a rotary driving element within said rim journaled on an axis eccentric to that of said wheel and provided with a series of radial projections adapted to engage said lugs successively, and means for putting either the clutch part on the sleeve or the projections on the driving element into driving relation with the cooperating elements on the wheel.

4. A variable drive device comprising a shaft, a driven wheel splined on said shaft, said wheel having a laterally offset rim provided with a plurality of equally spaced lugs on its inner side, a driving pinion journaled within said rim on an axis eccentric to that of the wheel and provided with a plurality of adjacent sets of equally spaced projections the number of projections differing in each set, and means for shifting said drive wheel on said shaft to bring its lugs into operative relation with any set of projections on said pinion.

5. A variable drive device comprising a shaft, a driven wheel on said shaft provided with internal drive lugs, and a driving pinion mounted within the periphery of said wheel on an axis eccentric to that of said shaft and positioned in cooperative relation to said lugs and provided with equally spaced driving projections, the spaces between projections being sufficiently great to interrupt the movement transmitted to the wheel by the pinion.

6. A variable drive device comprising a rotary driven element having a laterally offset rim formed with a series of equally spaced lugs on its inner side, a driving element eccentrically journaled within said rim and having a plurality of adjacent sets of driving projections, means for putting the driven element into cooperative relation with any set of projections on the driving element, and means for connecting said driven and driving elements for joint rotation.

7. A variable drive device comprising an axially shiftable driven element having a radially extending portion provided with a laterally offset rim formed with inwardly extending drive teeth, a drive pinion journaled within said rim on an axis eccentric to that of the driven element and having radial teeth adapted to engage the teeth on the rim, and complemental clutch elements on said pinion and radial portion of the driven element.

In testimony whereof I affix my signature.

SAMUEL K. DENNIS.